US011223405B2

(12) United States Patent
Park et al.

(10) Patent No.: US 11,223,405 B2
(45) Date of Patent: Jan. 11, 2022

(54) METHOD FOR REPORTING CHANNEL STATE INFORMATION ON BASIS OF PRIORITIES IN WIRELESS COMMUNICATION SYSTEM AND DEVICE THEREFOR

(71) Applicant: LG ELECTRONICS INC., Seoul (KR)

(72) Inventors: Haewook Park, Seoul (KR); Kijun Kim, Seoul (KR); Jonghyun Park, Seoul (KR); Sukhyon Yoon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/764,832

(22) PCT Filed: Nov. 19, 2018

(86) PCT No.: PCT/KR2018/014232
§ 371 (c)(1),
(2) Date: May 15, 2020

(87) PCT Pub. No.: WO2019/098799
PCT Pub. Date: May 23, 2019

(65) Prior Publication Data
US 2020/0343955 A1  Oct. 29, 2020

Related U.S. Application Data

(60) Provisional application No. 62/587,542, filed on Nov. 17, 2017.

(51) Int. Cl.
*H04B 7/06* (2006.01)
*H04W 24/10* (2009.01)
*H04W 72/04* (2009.01)

(52) U.S. Cl.
CPC .......... *H04B 7/0626* (2013.01); *H04W 24/10* (2013.01); *H04W 72/042* (2013.01)

(58) Field of Classification Search
CPC ... H04B 7/0626; H04W 24/10; H04W 72/042
See application file for complete search history.

(56) References Cited

U.S. PATENT DOCUMENTS 8,681,627 B2  3/2014  Choudhury et al.
9,357,420 B2  5/2016  Ahn et al.
(Continued)

FOREIGN PATENT DOCUMENTS

WO  2017078603  5/2017

OTHER PUBLICATIONS

PCT International Application No. PCT/KR2018/014232, International Search Report dated Mar. 19, 2019, 4 pages.

*Primary Examiner* — Ronald B Abelson
(74) *Attorney, Agent, or Firm* — Lee Hong Degerman Kang & Waimey

(57) ABSTRACT

The present specification provides a method for reporting channel state information (CSI) on the basis of priorities in a wireless communication system. More specifically, the method performed by a terminal comprises: a step of receiving, from a base station, downlink control information (DCI) including a reporting trigger for a plurality of CSIs of the same type; and a step of reporting a specific CSI determined on the basis of a predetermined rule among the plurality of CSIs if a time resource and a frequency resource for reporting among the plurality of CSIs are the same, wherein the specific CSI is a CSI that has priority among the plurality of CSIs on the basis of the predetermined rule.

9 Claims, 12 Drawing Sheets

(56) References Cited

U.S. PATENT DOCUMENTS

| | | |
|---|---|---|
| 9,622,727 B2 | 4/2017 | Lunttila et al. |
| 2012/0275398 A1* | 11/2012 | Chen ..................... H04W 72/04 |
| 2013/0114554 A1* | 5/2013 | Yang ..................... H04W 24/10 |
| 2013/0294352 A1* | 11/2013 | Park ...................... H04W 24/10 |
| 2016/0150490 A1* | 5/2016 | Ouchi .................... H04W 52/16 |
| 2017/0188255 A1 | 6/2017 | Chandrasekhar et al. |
| 2020/0322030 A1* | 10/2020 | Yuan ..................... H04L 5/0091 |

* cited by examiner

【Figure 1】
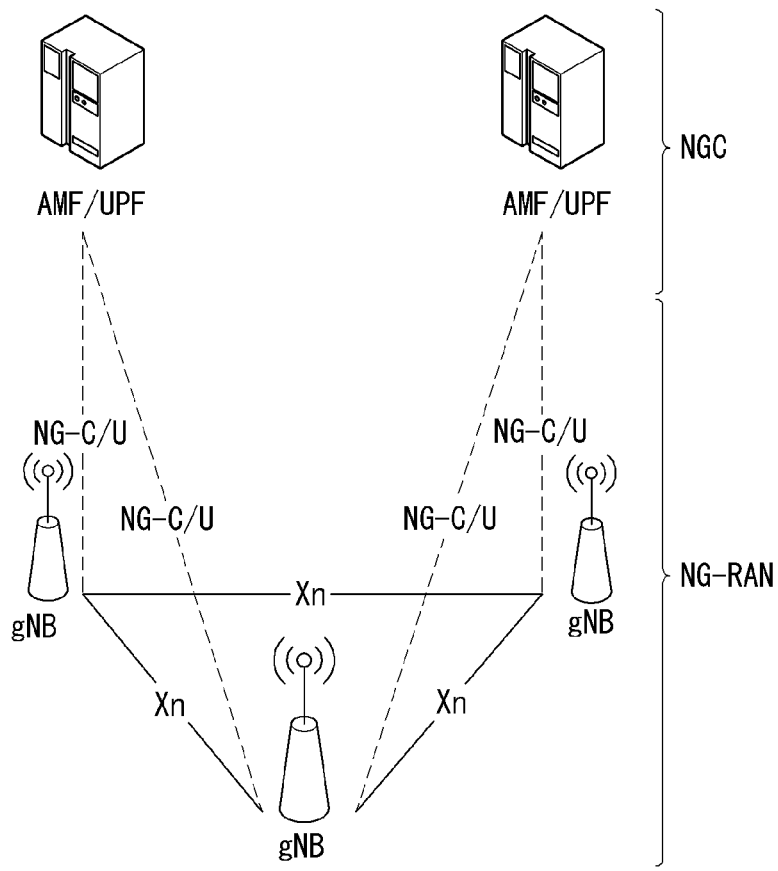
【Figure 2】
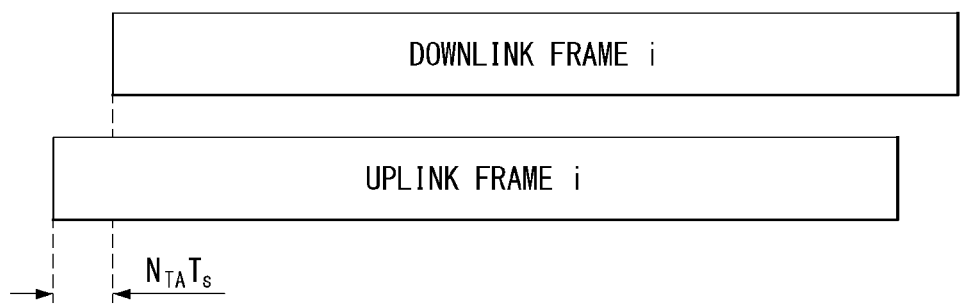

[Figure 3]
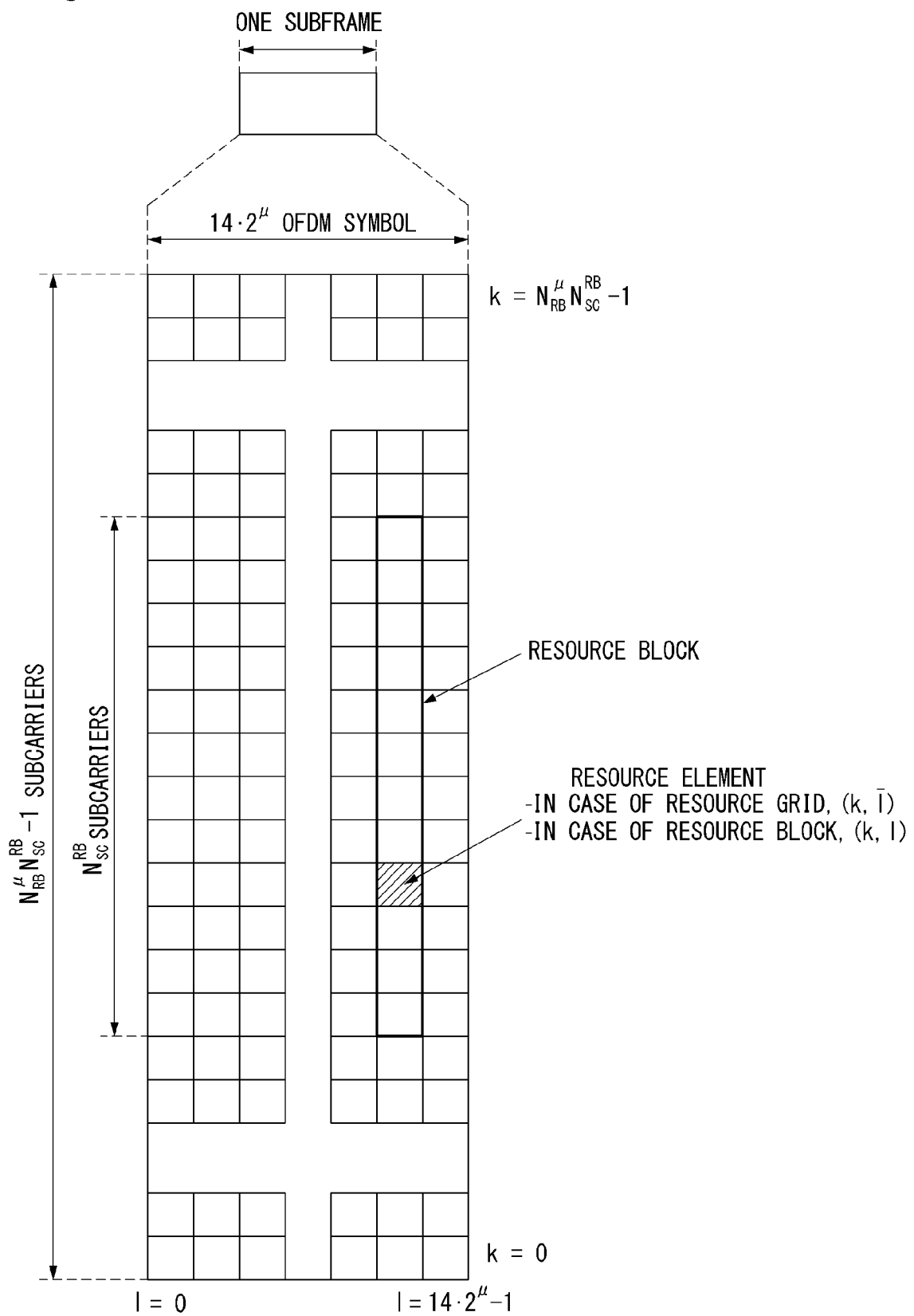

【Figure 4】
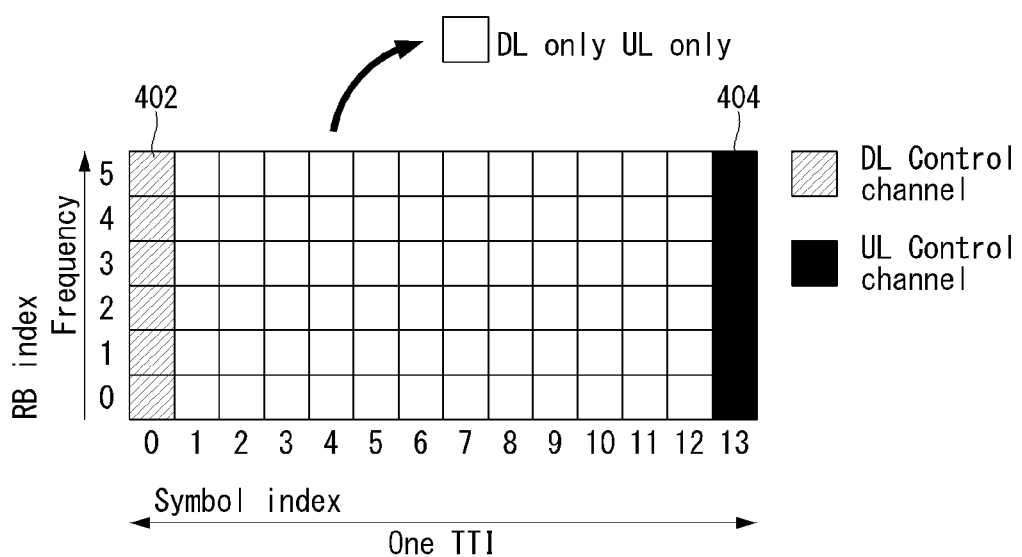

【Figure 5】
(a)
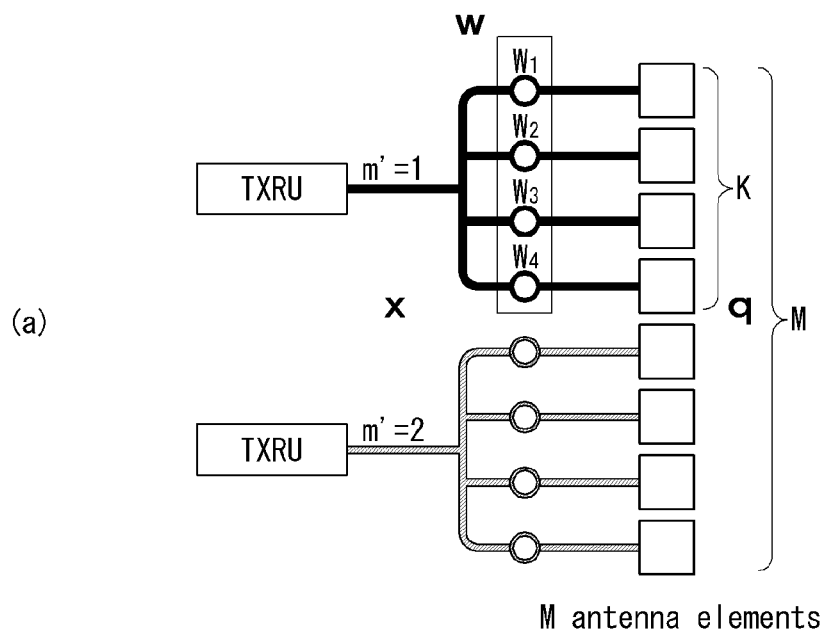
M antenna elements
(b)
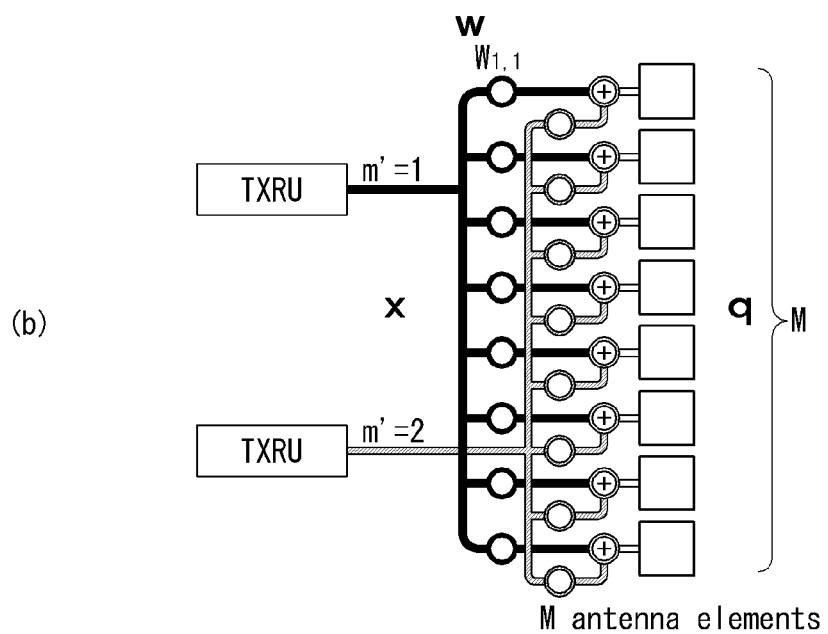
M antenna elements

【Figure 6】
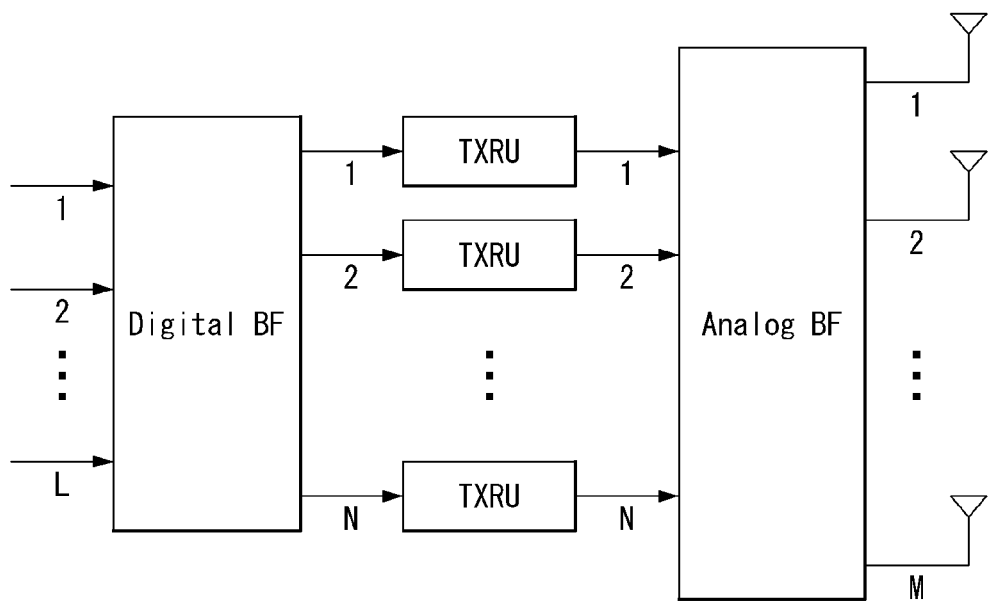

【Figure 7】
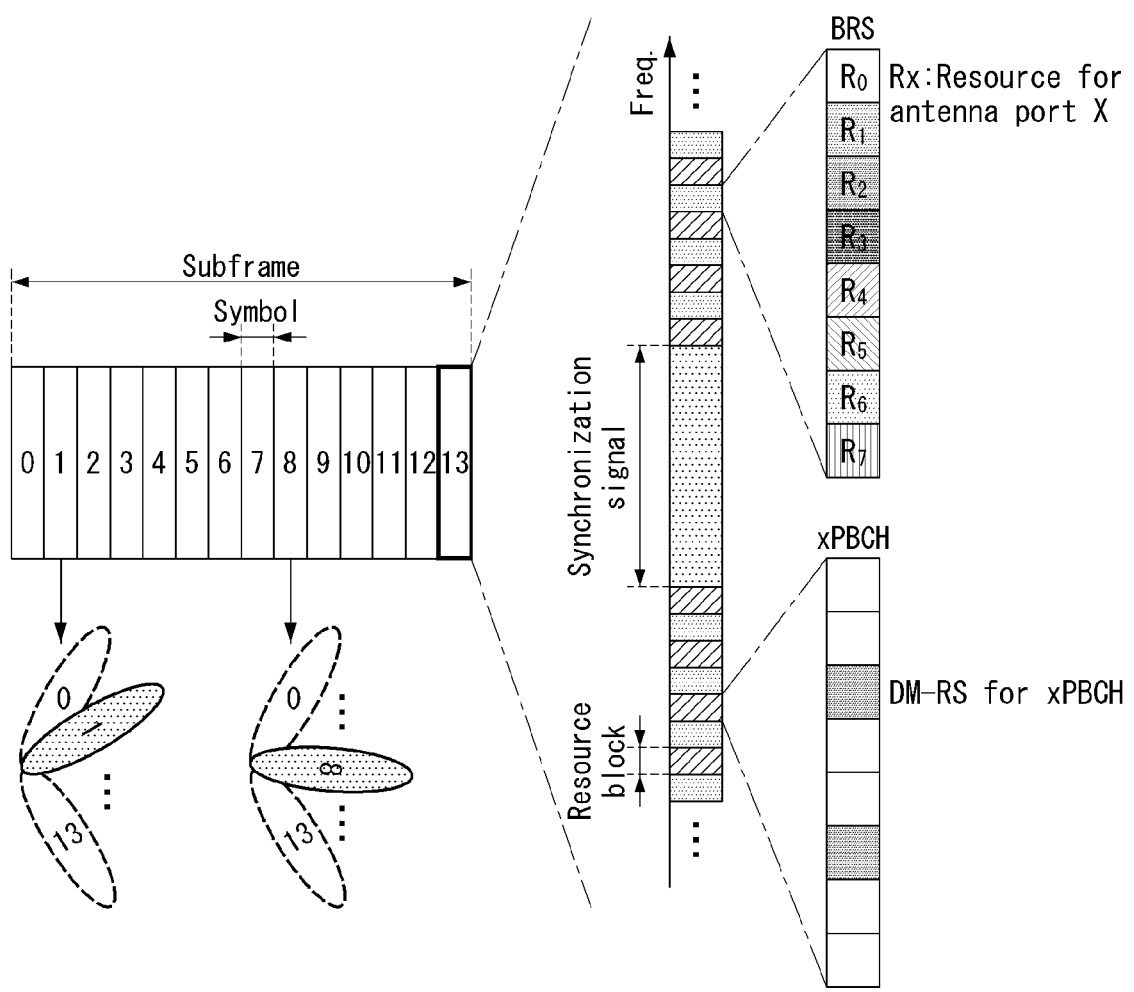

【Figure 8】
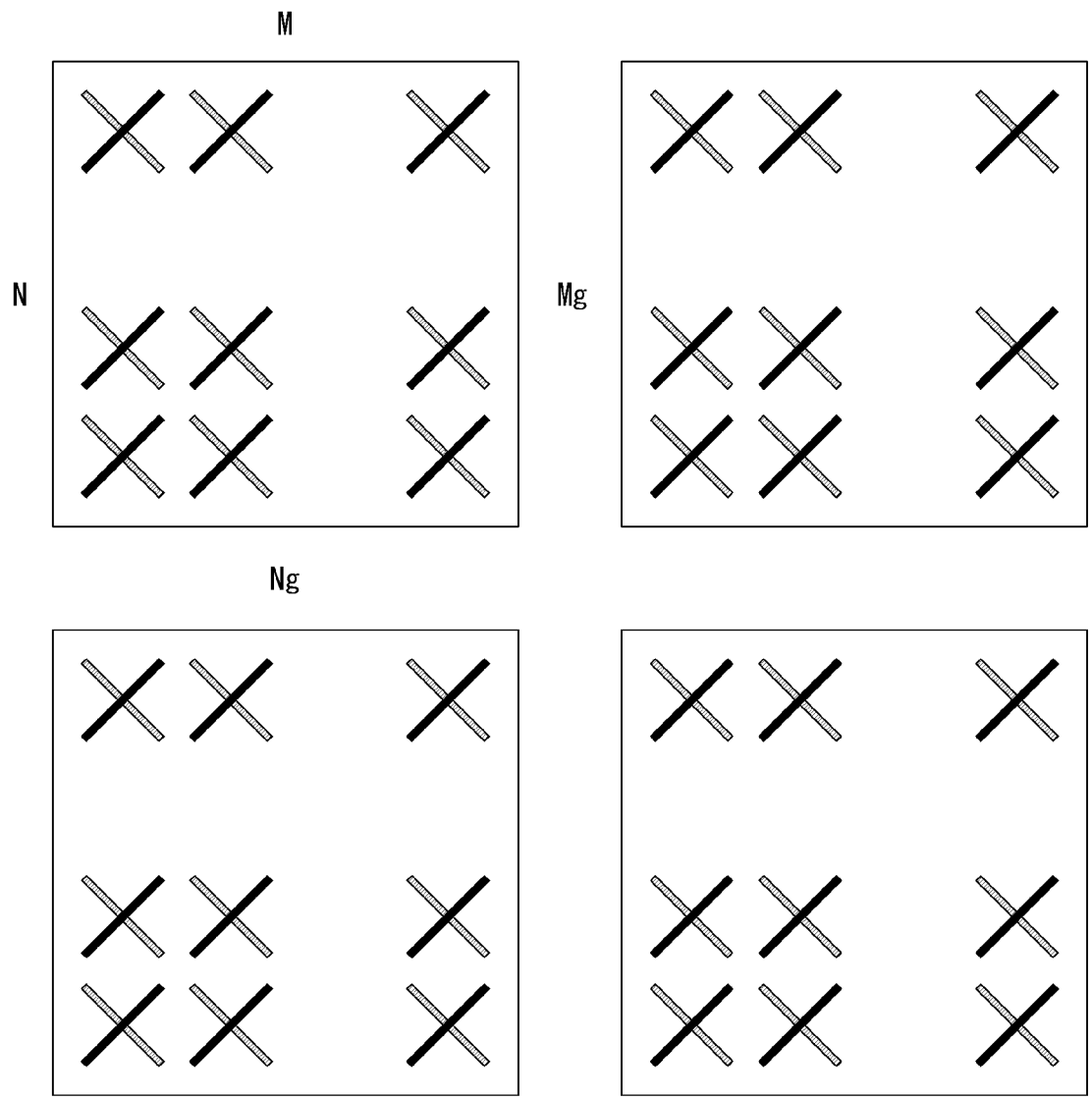

【Figure 9】
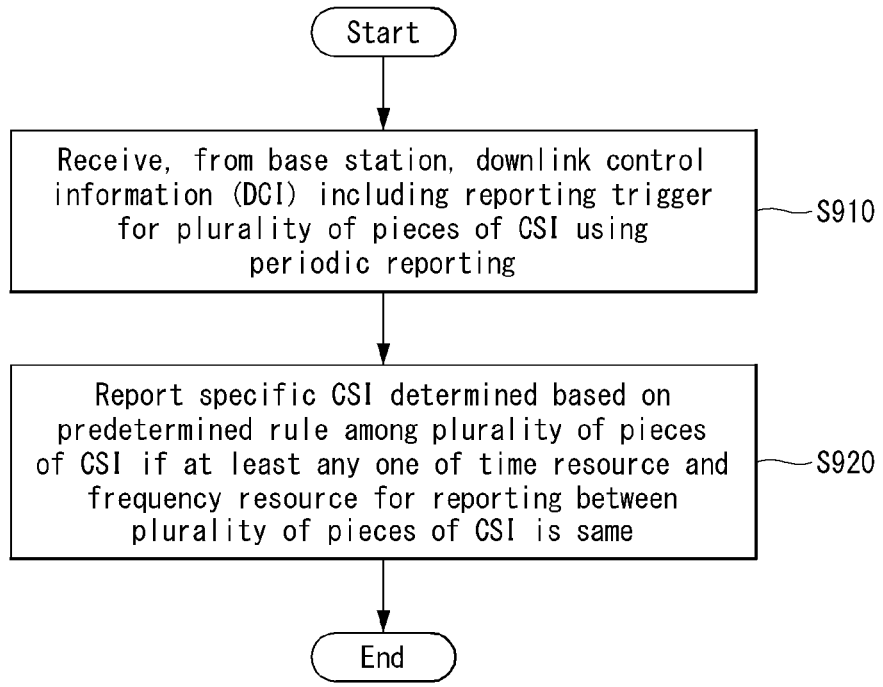
【Figure 10】
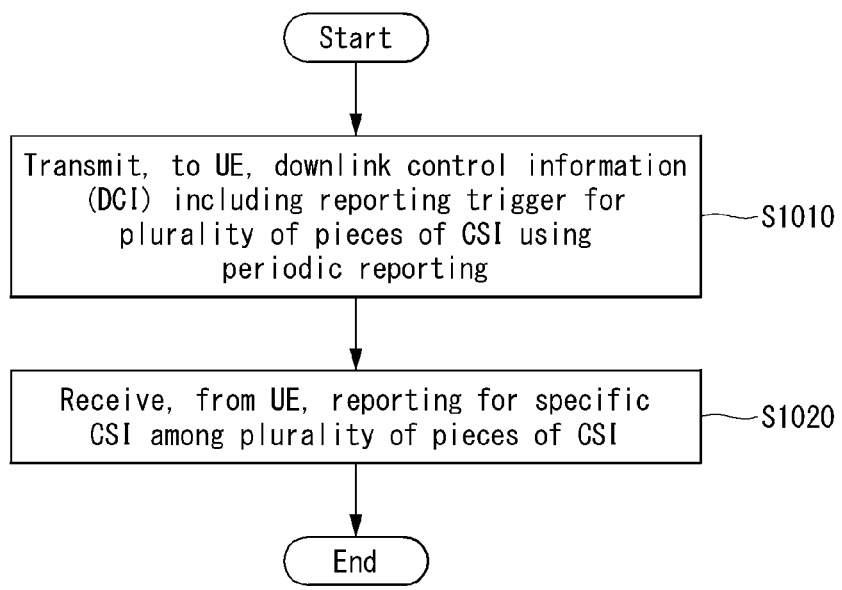

【Figure 11】
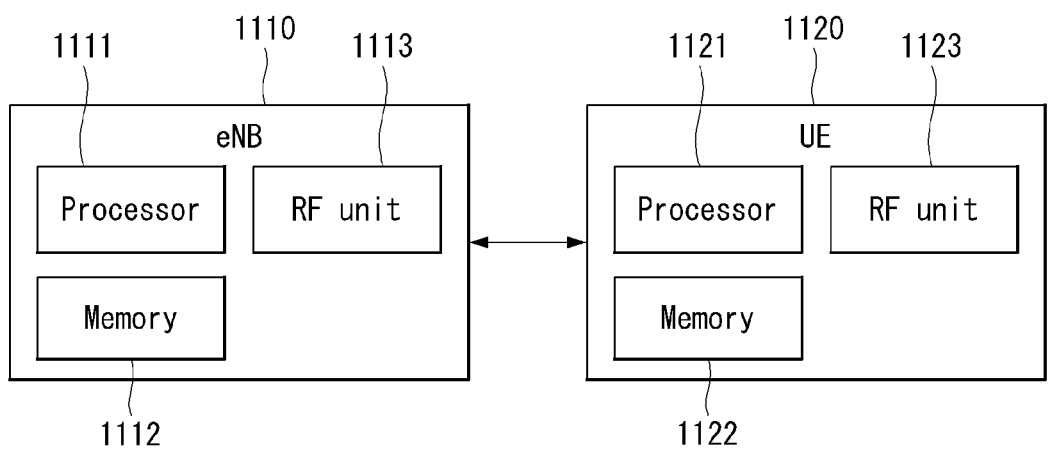

[Figure 12]
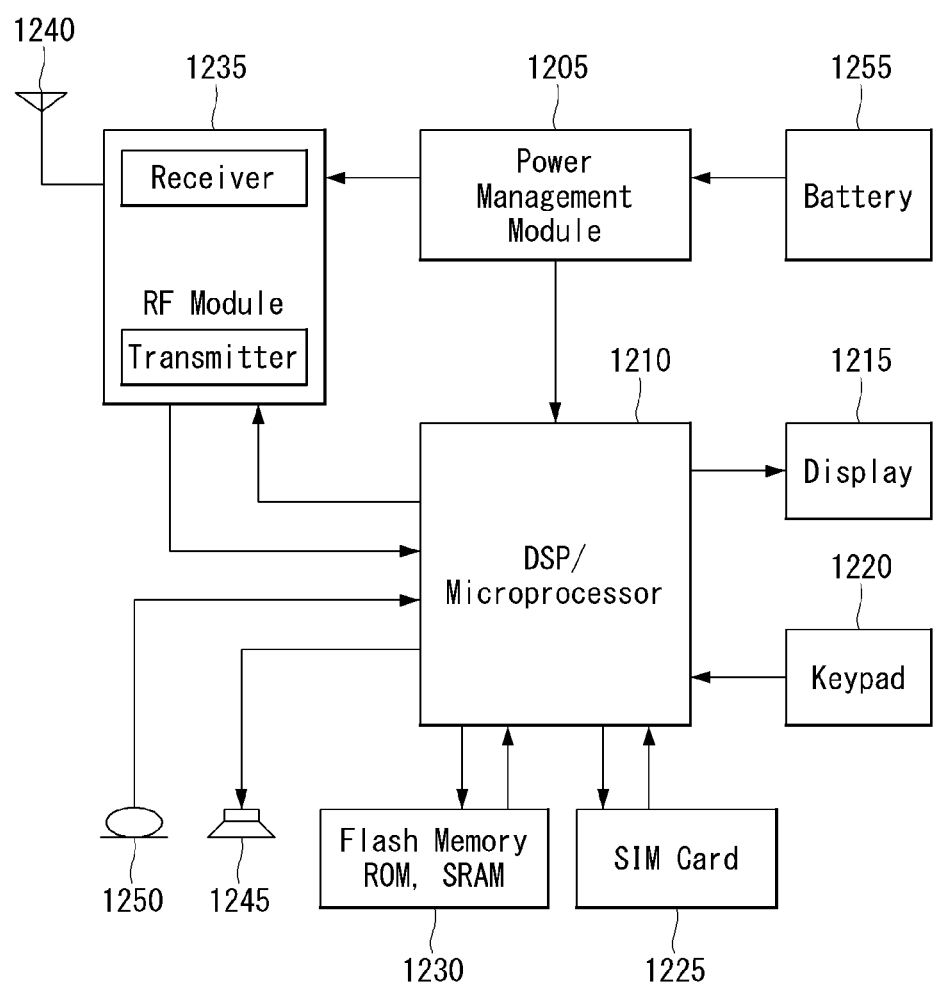

【Figure 13】
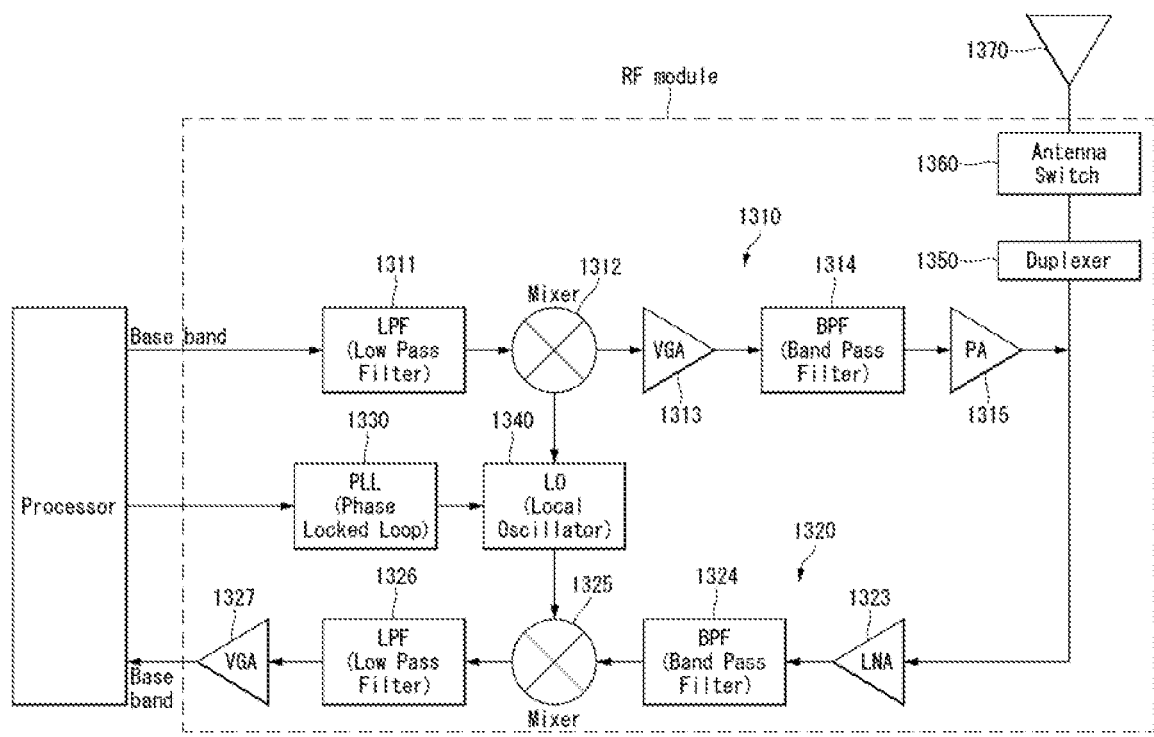

【Figure 14】
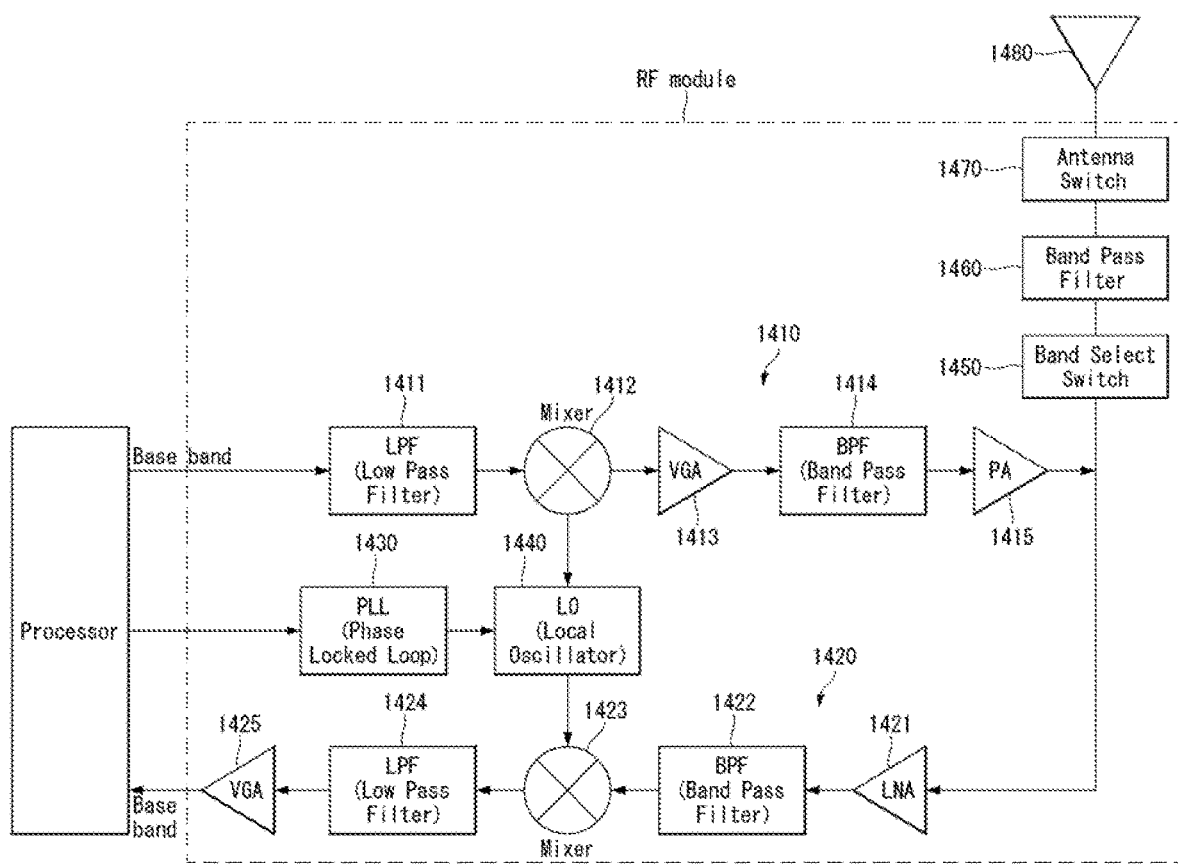

METHOD FOR REPORTING CHANNEL STATE INFORMATION ON BASIS OF PRIORITIES IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2018/014232, filed on Nov. 19, 2018 which claims the benefit of U.S. Provisional Application No. 62/587,542, filed on Nov. 17, 2017, the contents of which are all hereby incorporated by reference herein in their entirety.

TECHNICAL FIELD

The present disclosure relates to a wireless communication system and, more particularly, to a method of reporting channel state information (CSI) based on a priority and an apparatus supporting the same.

BACKGROUND ART

A mobile communication system has been developed to provide a voice service while ensuring the activity of a user. However, the area of the mobile communication system has extended to data services in addition to voice services. Today, resources are insufficient due to an explosive increase in traffic, and users demand a higher speed service. As a result, a more advanced mobile communication system is necessary.

Requirements for a next-generation mobile communication system should be able to support the accommodation of explosive data traffic, a dramatic increase in the data rate per use, the accommodation of a significant increase in the number of connected devices, very low end-to-end latency, and high-energy efficiency. To this end, various technologies are researched, including dual connectivity, massive multiple input multiple output (MIMO), in-band full duplex, non-orthogonal multiple access (NOMA), super wideband support, and device networking.

DISCLOSURE

Technical Problem

The present disclosure provides a method of reporting channel state information (CSI) based on a priority.

The technical problems to be achieved by the present disclosure are not limited to the above-mentioned technical problems and any other technical problems that are not mentioned may be clearly understood by those skilled in the art to which the present disclosure pertains from the following descriptions.

Technical Solution

The present disclosure provides a method of reporting channel state information (CSI) based on a priority in a wireless communication system.

Specifically, the method performed by a terminal includes receiving, from a base station, downlink control information (DCI) including a reporting trigger for a plurality of pieces of CSI using periodic reporting and reporting specific CSI determined based on a predetermined rule among the plurality of pieces of CSI when at least any one of time resources and frequency resources for reporting between the plurality of pieces of CSI is identical. The specific CSI is CSI prioritized based on the predetermined rule among the plurality of pieces of CSI.

Furthermore, in the present disclosure, the predetermined rule includes prioritizing CSI having a long period among the plurality of pieces of CSI having the same time resource or frequency resource.

Furthermore, in the present disclosure, the predetermined rule includes prioritizing semi-persistent CSI (SP-CSI) over periodic-CSI (P-CSI) when the plurality of pieces of CSI having the same time resource or frequency resource has an identical period.

Furthermore, in the present disclosure, the predetermined rule includes prioritizing SP-CSI over P-CSI when the plurality of pieces of CSI having the same time resource or frequency resource has a period difference within a threshold or preset range.

Furthermore, in the present disclosure, the predetermined rule is transmitted through higher layer signaling.

Furthermore, in the present disclosure, a terminal performing a method of reporting channel state information (CSI) based on a priority in a wireless communication system includes a radio frequency (RF) module for transmitting and receiving radio signals and a processor functionally connected to the RF module. The processor is configured to receive, from a base station, downlink control information (DCI) including a reporting trigger for a plurality of pieces of CSI using periodic reporting and to report specific CSI determined based on a predetermined rule among the plurality of pieces of CSI when at least any one of time resources and frequency resources for reporting between the plurality of pieces of CSI is identical. The specific CSI is CSI prioritized based on the predetermined rule among the plurality of pieces of CSI.

Furthermore, in the present disclosure, the predetermined rule includes prioritizing CSI having a long period among the plurality of pieces of CSI having the same time resource or frequency resource.

Furthermore, in the present disclosure, the predetermined rule includes prioritizing semi-persistent CSI (SP-CSI) over periodic-CSI (P-CSI) when the plurality of pieces of CSI having the same time resource or frequency resource has an identical period.

Furthermore, in the present disclosure, the predetermined rule includes prioritizing SP-CSI over P-CSI when the plurality of pieces of CSI having the same time resource or frequency resource has a period difference within a threshold or preset range.

Furthermore, in the present disclosure, the predetermined rule is configured to be transmitted through higher layer signaling.

Furthermore, in the present disclosure, a method of reporting channel state information (CSI) based on a priority in a wireless communication system, the method performed by a base station includes transmitting, to a terminal, downlink control information (DCI) including a reporting trigger for a plurality of pieces of CSI using periodic reporting and receiving, from the terminal, reporting for specific CSI among the plurality of pieces of CSI. The specific CSI is CSI prioritized based on the predetermined rule among the plurality of pieces of CSI.

Advantageous Effects

The present disclosure has an effect in that CSI can be reported using a predetermined priority rule when a collision occurs between a plurality of pieces of CSI.

It will be appreciated by persons skilled in the art that that the effects that could be achieved with the present disclosure are not limited to what has been particularly described hereinabove and other advantages of the present disclosure will be more clearly understood by a person skilled in the art to which the present disclosure pertains, from the following detailed description.

DESCRIPTION OF DRAWINGS

The accompany drawings, which are included as part of the detailed description in order to help understanding of the present disclosure, provide embodiments of the present disclosure and describe the technical characteristics of the present disclosure along with the detailed description.

FIG. 1 is a diagram showing an example of a general system configuration of NR to which a method proposed in this specification may be applied.

FIG. 2 shows a relation between an uplink frame and a downlink frame in a wireless communication system to which a method proposed in this specification may be applied.

FIG. 3 shows an example of a resource grid supplied in a wireless communication system to which a method proposed in this specification may be applied.

FIG. 4 illustrates an example of a self-contained subframe structure to which a method proposed in the present disclosure may be applied.

FIG. 5 illustrates a transceiver unit model in a wireless communication system to which a method proposed in the present disclosure may be applied.

FIG. 6 is a diagram illustrating a hybrid beamforming structure from the point of view of a TXRU and physical antenna in a wireless communication system to which a method proposed in the present disclosure may be applied.

FIG. 7 is a diagram illustrating an example of a beam sweeping operation to which a method proposed in the present disclosure may be applied.

FIG. 8 is a diagram illustrating an example of an antenna array to which a method proposed in the present disclosure may be applied.

FIG. 9 is a flowchart illustrating an example of an operating method of a UE reporting channel state information based on a priority, which is proposed in the present disclosure.

FIG. 10 is a flowchart illustrating an example of an operating method of a base station receiving channel state information based on a priority, which is proposed in the present disclosure.

FIG. 11 illustrates a block diagram of a wireless communication apparatus to which methods proposed in the present disclosure may be applied.

FIG. 12 illustrates a block diagram of a communication apparatus according to an embodiment of the present disclosure.

FIG. 13 is a diagram illustrating an example of the RF module of a wireless communication apparatus to which a method proposed in the present disclosure may be applied.

FIG. 14 is a diagram illustrating another example of the RF module of a wireless communication apparatus to which a method proposed in the present disclosure may be applied.

MODE FOR INVENTION

Reference will now be made in detail to embodiments of the disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

In the present disclosure, a base station (BS) means a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced with terms such as a fixed station, Node B, evolved-NodeB (eNB), a base transceiver system (BTS), an access point (AP), gNB (general NB), and the like. Further, a 'terminal' may be fixed or movable and may be replaced with terms such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

In the present disclosure, downlink (DL) means communication from the base station to the terminal, and uplink (UL) means communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present disclosure, and may be changed to other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11(Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

Further, 5G new radio (NR) defines enhanced mobile broadband (eMBB), massive machine type communications (mMTC), ultra-reliable and low latency communications (URLLC), and vehicle-to-everything (V2X) based on usage scenario.

A 5G NR standard is divided into standalone (SA) and non-standalone (NSA) depending on co-existence between a NR system and a LTE system.

The 5G NR supports various subcarrier spacings and supports CP-OFDM in the downlink and CP-OFDM and DFT-s-OFDM (SC-OFDM) in the uplink.

Embodiments of the present disclosure can be supported by standard documents disclosed in at least one of IEEE 802, 3GPP, and 3GPP2 which are the wireless access systems. That is, steps or parts in embodiments of the present disclosure which are not described to clearly show the technical spirit of the present disclosure can be supported by the standard documents. Further, all terms described in the present disclosure can be described by the standard document.

3GPP LTE/LTE-A/New RAT (NR) is primarily described for clear description, but technical features of the present disclosure are not limited thereto.

Definition of Terms eLTE eNB: The eLTE eNB is the evolution of an eNB supporting connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and a well-defined functional behaviour.

NG-C: A control plane interface used on NG2 reference points between a new RAN and an NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

General System

FIG. 1 illustrates an example of an overall structure of a NR system to which a method proposed by the present specification is applicable.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to an access and mobility management function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or $\mu$). In addition, although very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$ and $N_f=4096$. DL and UL transmission is configured as a radio frame having a section of $T_f(\Delta f_{max}N_f/100) \cdot T_s=10$ ms. The radio frame is composed of ten subframes each having a section of $T_{sf}=(\Delta f_{max}N_f/1000) \cdot T_s=1$ ms. In this case, there may be a set of UL frames and a set of DL frames.

FIG. 2 illustrates a relation between an uplink frame and a downlink frame in a wireless communication system to which a method proposed by the present specification is applicable.

As illustrated in FIG. 2, a UL frame number I from a user equipment (UE) needs to be transmitted $T_{TA}=N_{TA}T_s$ before the start of a corresponding DL frame in the UE.

Regarding the numerology $\mu$, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology $\mu$, and Table 3 shows the number of OFDM symbols per slot for an extended CP in the numerology $\mu$.

TABLE 2

| | Slot configuration | | | | | |
|---|---|---|---|---|---|---|
| | 0 | | | 1 | | |
| $\mu$ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |

TABLE 2-continued

| | Slot configuration | | | | | |
|---|---|---|---|---|---|---|
| | 0 | | | 1 | | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of Delay spread, Doppler spread, Frequency shift, Average received power, and Received Timing.

FIG. 3 illustrates an example of a resource grid supported in a wireless communication system to which a method proposed by the present specification is applicable.

Referring to FIG. 3, a resource grid is composed of $N_{RB}^{\mu} N_{sc}^{RB}$ subcarriers in a frequency domain, each subframe composed of 14·2 μOFDM symbols, but the present disclosure is not limited thereto.

In the NR system, a transmitted signal is described by one or more resource grids, composed of $N_{RB}^{\mu} N_{sc}^{RB}$ subcarriers, and $2^{\mu} N_{symb}^{(\mu)}$ OFDM symbols wherein $N_{RB}^{\mu} \leq N_{RB}^{max,\mu}$. $N_{RB}^{max,\mu}$ indicates a maximum transmission bandwidth, and it may change not just between numerologies, but between UL and DL.

In this case, as illustrated in FIG. 3, one resource grid may be configured for each numerology μ and antenna port p.

Each of the elements of the resource grid for the numerology μ and the antenna port p is indicated as a resource element, and may be uniquely identified by an index pair (k, l). Herein k=0, . . . , $N_{RB}^{\mu} N_{sc}^{RB}-1$ is an index in the frequency domain, and l=0, . . . , $2^{\mu} N_{symb}^{(\mu)}-1$ indicates a location of a symbol in a subframe. To indicate a resource element in a slot, the index pair (k,l) is used, where l=0, . . . , $N_{symb}^{\mu}-1$.

The resource element (k,l) for the numerology μ and the antenna port p corresponds to a complex value $a_{k,l}^{(p,\mu)}$. When there is no risk of confusion or when a specific antenna port or numerology is specified, the indexes p and μ may be dropped and thereby the complex value may become $a_{k,l}^{(p)}$ or $a_{k,l}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \qquad [\text{Equation 1}]$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Self-Contained Subframe Structure

A time division duplexing (TDD) structure considered in an NR system is a structure in which both uplink (UL) and downlink (DL) are processed in one subframe. This is for minimizing the latency of data transmission in the TDD system, and this structure is referred to as a self-contained subframe structure.

FIG. 4 illustrates an example of a self-contained subframe structure to which a method proposed in the present disclosure may be applied. FIG. 2 is merely for convenience of description, and does not limit the scope of the present disclosure.

Referring to FIG. 4, as in the case of legacy LTE, it is assumed that one subframe is configured with 14 orthogonal frequency division multiplexing (OFDM) symbols.

In FIG. 4, a region 402 means a downlink control region, and a region 404 means an uplink control region. Furthermore, a region (i.e., region not having a separate indication) except the region 402 and the region 404 may be used for the transmission of downlink data or uplink data.

That is, uplink control information and downlink control information are transmitted in one self-contained subframe. In contrast, in the case of data, uplink data or downlink data is transmitted in one self-contained subframe.

If the structure illustrated in FIG. 4 is used, downlink transmission and uplink transmission are sequentially performed within one self-contained subframe. The transmission of downlink data and the reception of uplink ACK/NACK may be performed.

As a result, if an error of data transmission occurs, the time taken up to the retransmission of the data can be reduced. Accordingly, latency related to data transmission can be minimized.

In a self-contained subframe structure such as FIG. 4, there is a need for a time gap for a process of an eNodeB (eNB, gNB) and/or a terminal (user equipment (UE)) switching from a transmission mode to a reception mode or a process of the eNB and/or the UE switching from the reception mode to the transmission mode. In relation to the time gap, if uplink transmission is performed after downlink transmission in the self-contained subframe, some OFDM symbol(s) may be configured as a guard period (GP).

Analog Beamforming

In mmW, multiple antennas may be installed in the same area because a wavelength is sort. That is, the wavelength is 1 cm in a 30 GHz band, and thus a total of 100 antenna elements may be installed in a 5 by 5 cm panel at intervals of 0.5 lambda (wavelength, λ) in a two-dimension array form.

Accordingly, in mmW, coverage or throughput is increased by raising a beamforming (BF) gain using multiple antennas elements.

In this case, if each antenna element has a transceiver unit (TXRU) so that transmission power and phase are adjusted, independent beamforming can be performed for each frequency resource.

However, there is a problem in that effectiveness is low in terms of the price if the TXRUs are installed in all of 100 antenna elements.

Accordingly, a method of mapping multiple antennas elements to one TXRU and adjusting the direction of a beam using an analog phase shifter is considered.

Such an analog beamforming method has a disadvantage in that frequency selective beaming cannot be performed because only one beam direction is possible in a full band.

A hybrid BF having B TXRUs smaller than the number of Q antenna elements, which is a middle form of digital BF and analog BF, is considered.

In this case, there is a difference depending on a method of connecting the B TXRUs and the Q antenna elements, but the direction of beams capable of simultaneous transmission is limited to B or less.

Hereinafter, representative examples of TXRUs and antenna elements are described with reference to drawings.

FIG. 5 illustrates a transceiver unit model in a wireless communication system to which a method proposed in the present disclosure may be applied.

A TXRU virtualization model indicates a relationship between the output signal of a TXRU and output signals of antenna elements. The TXRU virtualization model may be divided into a TXRU virtualization model option-1: a sub-array partition model, as in FIG. 5(a), and a TXRU virtualization model option-2: a full-connection model, as in FIG. 5(b), depending on a correlation relationship between the antenna elements and the TXRU.

Referring to FIG. 5(a), in the case of the sub-array partition model, the antenna elements are partitioned into multiple antenna element groups, and each TXRU is connected to one of the groups. In this case, the antenna elements are connected to only one TXRU.

Referring to FIG. 5(b), in the case of the full-connection model, the signals of multiple TXRUs are combined and transmitted to a single antenna element (or an array of antenna elements). That is, FIG. 5(b) illustrates a method in which TXRUs are connected to all antenna elements. In this case, the antenna elements are connected to all the TXRUs.

In FIG. 5, q is a transmission signal vector of antenna elements having M co-polarizations within one column. W is a wideband TXRU virtualization weight vector. W indicates a phase vector multiplied by an analog phase shifter. That is, the direction of analog beamforming is determined by W. x is the signal vector of M_TXRU TXRUs.

In this case, mapping between an antenna port and the TXRUs may be 1-to-1 or 1-to-many.

In FIG. 5, the mapping (TXRU-to-element mapping) between the TXRU and the antenna element merely illustrates one example, and the present disclosure is not limited thereto. The present disclosure may be identically applied to mapping between a TXRU and an antenna element which may be implemented in various forms, from the point of view of hardware.

Furthermore, in the new RAT system, if multiple antennas are used, a hybrid beamforming scheme in which digital beamforming and analog beamforming have been combined is emerging. In this case, analog beamforming (or radio frequency (RF) beamforming) means an operation of performing precoding (or combining) in an RF stage. In the hybrid beamforming, each of a baseband stage and an RF stage performs precoding (or combining). Accordingly, there are advantages in that the number of RF chains and the number of digital (D)/analog (A) (or A/D) converters can be reduced and performance close to digital beamforming can also be obtained. For convenience sake, the hybrid beamforming structure may be represented as N transceiver units (TXRUs) and M physical antennas. Accordingly, digital beamforming for L data layers which may be transmitted in a transmission stage may be represented as an N by L matrix. N digital signals that are subsequently transformed are transformed into an analog signal through the TXRUs. Thereafter, analog beamforming represented as an M by N matrix is applied to the analog signal.

FIG. 6 is a diagram illustrating a hybrid beamforming structure from the point of view of a TXRU and physical antenna in a wireless communication system to which a method proposed in the present disclosure may be applied.

FIG. 6 illustrates a case where the number of digital beams is L and the number of analog beams is N.

In the New RAT system, a direction in which a base station is designed to change analog beamforming in a symbol unit in order to support more efficient beamforming for a UE located in a specific area is considered. Furthermore, in FIG. 6, when specific N TXRUs and M RF antennas are defined as one antenna panel, in the New RAT system, a method of introducing a plurality of antenna panels to which independent hybrid beamforming may be applied is also considered.

Channel state information (CSI) feedback

In the 3GPP LTE/LTE-A system, it has been defined that a user equipment (UE) reports channel state information (CSI) to a base station (BS or eNB).

CSI generally refers to information which may indicate quality of a radio channel (or also called a link) formed between a UE and an antenna port. For example, a rank indicator (RI), a precoding matrix indicator (PMI) or a channel quality indicator (CQI) corresponds to CSI.

In this case, the RI indicates rank information of a channel, and means the number of streams received by a UE through the same time-frequency resource. This value is determined depending on the long term fading of a channel. In general, this is fed back from a UE to a BS with a longer term than that of a PMI or CQI. The PMI is a value into which a channel spatial characteristic has been incorporated, and indicates a precoding index preferred by a UE based on metric, such as a signal-to-interference-plus-noise ratio (SINR). The CQI is a value indicative of the intensity of a channel. In general, the CQI means a reception SINR which may be obtained by a BS when the BS uses a PMI.

In the 3GPP LTE/LTE-A system, a BS may configure multiple CSI processes in a UE and receive reporting for CSI for each process. In this case, the CSI process is configured with a CSI-RS for signal quality measurement and a CSI-interference measurement (CSI-IM) resource for interference measurement from the BS.

Reference signal (RS) virtualization

In mmW, a PDSCH may be transmitted only in one analog beam direction at one piece of timing by analog beamforming. In this case, data transmission from a base station to only some UEs in a corresponding direction is possible. Accordingly, data may be transmitted to multiple UEs in several analog beam directions at the same time by differently setting the analog beam directions for each antenna port, if necessary.

FIG. 7 is a diagram illustrating an example of a beam sweeping operation to which a method proposed in the present disclosure may be applied.

As described in FIG. 6, if a base station uses a plurality of analog beams, an analog beam advantageous for signal reception may be different for each UE. Accordingly, a beam sweeping operation is considered in which a base station changes a plurality of analog beams to be applied based on a symbol in a specific subframe with respect to at least a synchronization signal, system information, and paging so that all UEs can have a reception opportunity.

FIG. 7 illustrates an example of a beam sweeping operation for a synchronization signal and system information in a downlink transmission process. In FIG. 7, a physical resource (or physical channel) in which system information is transmitted in a broadcasting manner in the New RAT is called a physical broadcast channel (xPBCH).

In this case, analog beams belonging to different antenna panels within one symbol may be transmitted at the same time. In order to measure a channel according to an analog beam, a method of introducing a beam reference signal (BRS), that is, a reference signal to which a single analog beam (corresponding to a specific antenna panel) is applied and which is transmitted, as illustrated in FIG. 7, is being discussed.

The BRS may be defined with respect to a plurality of antenna ports. Each antenna port of the BRS may correspond to one analog beam.

In this case, unlike in the BRS, all analog beams within an analog beam group may be applied to a synchronization signal or xPBCH so that signals transmitted by given UEs are well received, and the synchronization signal or xPBCH may be transmitted.

RRM Measurement

The LTE system supports an RRM operation, including Power control, scheduling, Cell search, Cell reselection, Handover, Radio link or Connection monitoring, Connection Establish/Re-establish.

In this case, a serving cell may request, from a UE, RRM measurement information, that is, a measurement value for performing the RRM operation.

For example, the UE may measure information, such as cell search information for each cell, reference signal received power (RSRP), or reference signal received quality (RSRQ), and may report the measured information to a base station.

Specifically, in the LTE system, a UE receives, from a serving cell, "measConfig" through a higher layer signal for RRM measurement. The UE measures RSRP or RSRQ based on "measConfig."

The definition of RSRP, RSRQ and RSSI is as follows.

RSRP: RSRP may be defined as a linear average for a degree of power contribution ([W]) of resource elements which transmit a cell-specific reference signal which a considered measurement frequency bandwidth. For an RSRP determination, a cell-specific reference signal R0 may be used. If a UE can reliably detect that R1 is available, it may determine RSRP using the R1 in addition to R0.

A reference point of RSRP may be an antenna connector of a UE.

If receiver diversity is used by the UE, a reported value should not be lower than corresponding RSRP of a given diversity branch.

RSRQ: reference signal reception quality (RSRQ) is defined as a ratio N×RSRP/(E-UTRA carrier RSSI). N is the number of RBs of an E-UTRA carrier RSSI measurement bandwidth. The measurement of a numerator and a denominator needs to be performed through the same resource block set.

An E-UTRA carrier reception signal intensity indicator (RSSI) is received by a UE in a block from all sources, including a linear average of a total of reception power ([W]) measured only in an OFDM symbol including a reference symbol for an antenna port 0 and N resource-adjacent channel interference and thermal noise in a measurement bandwidth.

If higher layer signaling indicates a specific subframe for performing RSRQ measurement, the RSSI is measured with respect to all OFDM symbols within the indicated subframe.

A reference point for RSRQ needs to be an antenna connector of a UE.

If receiver diversity is used by the UE, a reported value should not be lower than corresponding RSRQ of a given diversity branch.

RSSI: an RSSI means received wideband power including thermal noise and noise occurring in a receiver within a bandwidth defined by a receiver pulse shaping filter.

A reference point for the measurement of an RSSI should be an antenna connector of a UE. If receiver diversity is used by the UE, a reported value should not be lower than corresponding UTRA carrier RSSI of a given diversity branch.

According to such a definition, a UE operating in the LTE system may be permitted to measure RSRP in a bandwidth corresponding to one of 6, 15, 25, 50, 75, 100 resource blocks (RBs) through an allowed measurement bandwidth-related information element (IE) transmitted in a system information block type 3 (SIB2) in the case of intra-frequency measurement and through an allowed measurement bandwidth transmitted in the SIB5 in the case of inter-frequency measurement.

Alternatively, if the above IE is not present, measurement may be performed in the frequency bands of all downlink (DL) systems by default. In this case, if a UE receives an allowed measurement bandwidth, the UE may consider a corresponding value as a maximum measurement bandwidth and freely measure a value of RSRP within the corresponding value.

However, if a serving cell transmits an IE defined as WB-RSRQ and sets an allowed measurement bandwidth to 50 RBs or more, the UE needs to calculate an RSRP value for all allowed measurement bandwidths. Meanwhile, measurement may be performed on an RSSI in a frequency band of the receiver of a UE depending on the definition of an RSSI bandwidth.

FIG. 8 is a diagram illustrating an example of an antenna array to which a method proposed in the present disclosure may be applied.

In FIG. 8, a generalized panel antenna array may be configured with Mg panels and Ng panels in a horizontal domain and vertical domain, respectively.

In this case, one panel is configured with M columns and N rows. In FIG. 8, an X-pol antenna has been assumed. Accordingly, a total number of antenna elements may be configured as the number of 2*M*N*Mg*Ng.

First, the definition of CSI used in the present disclosure is as follows.

Type 1 channel state information (CSI): this means a normal resolution codebook (e.g., LTE Class A).

Type 2 CSI: this means a high resolution codebook (e.g., linear combination codebook such as LTE Advanced CSI).

Periodic CSI (P-CSI): this means CSI constantly reported with a specific period and offset through higher layer signaling, such as RRC.

Semi-persistent CSI (SP-CSI): this means periodically reported CSI by being activated/deactivated by a network through a MAC CE and/or DCI for a specific purpose.

Aperiodic CSI (A-CSI): this means CSI reported at specific timing indicated by a network by triggering it using DCI and/or MAC CE for a specific purpose.

Type 1 CSI may collide against the Type 1 CSI, and Type 2 CSI and Type 2 CSI may collide against each other.

In this case, a priority between pieces of CSI is determined as follows depending on a CSI period type.

Aperiodic CSI is prioritized over P-CSI, aperiodic CSI is prioritized over SP-CSI, and CSI on a PUSCH is prioritized over CSI over a PUCCH.

Furthermore, only one CSI period type is piggybacked on a PUSCH.

In this case, if a collision occurs between pieces of CSI, low-priority CSI is dropped.

Meanwhile, if PUSCHs collide against each other, aperiodic CSI on the PUCCH is dropped.

Hereinafter, the present disclosure proposes a scheme for solving a collision between different pieces of CSI upon reporting of CSI in a system, such as NR.

(Proposal 1)

There is a case where a collision occurs between pieces of CSI having the same type (Type 1 or Type 2).

In this case, CSI having a relatively long period among SP-CSI and P-CSI has a priority.

Meanwhile, SP-CSI and P-CSI may be configured to have the same period or a period difference of a specific W (W is configurable) multiple or within a specific threshold (X slot or Y ms can be configurable).

In this case, the SP-CSI is prioritized over the P-CSI.

In this case, the P-CSI and SP-CSI (when activated) are CSI transmitted with a period.

In general, in the case of CSI having a short period, although the decoding of the CSI fails or is missed at specific timing, performance degradation of the CSI can be prevented directly using subsequent CSI or using CSI whose previous decoding is successful.

However, in general, in the case of CSI having a long period, if the CSI is missed, it is expected that performance degradation of the CSI will be great compared to CSI having a short period.

Accordingly, CSI having a relatively long period has a priority.

Meanwhile, as described above, if SP-CSI and P-SCI are configured to have the same period or a period difference of a specific W (W is configurable) multiple or within a specific threshold (X slot or Y ms can be configurable), the SP-CSI is prioritized over the P-CSI.

Alternatively, CSI having a long period is prioritized only when SP-CSI and P-SCI having a difference of a specific period multiple, and SP-CSI may be prioritized over P-CSI if not.

(Proposal 1-1)

When a collision between pieces of CSI having the same type (Type 1 or Type 2), a priority rule between the pieces of CSI among SP-CSI and P-CSI may be notified through a higher layer (e.g., RRC or MAC CE or DCI).

Hereinafter, a process of reporting channel state information based on a priority in a wireless communication system, which is proposed in the present disclosure, is described with reference to FIGS. 9 and 10.

FIG. 9 is a flowchart illustrating an example of an operating method of a UE reporting channel state information based on a priority, which is proposed in the present disclosure.

First, the UE receives, from a base station, downlink control information (DCI) including a reporting trigger for a plurality of pieces of CSI having the same type (S910).

Thereafter, if at least any one of a time resource and frequency resource for reporting between the plurality of pieces of CSI is the same, the UE reports, to the base station, specific CSI determined based on the predetermined rule among the plurality of pieces of CSI (S920).

In this case, the specific CSI may be prioritized CSI determined based on a predetermined rule among the plurality of pieces of CSI.

Furthermore, the plurality of pieces of CSI may be semi-persistent CSI (SP-CSI) and/or periodic CSI (P-CSI).

In this case, the plurality of pieces of CSI in which at least any one of the time resource or the frequency resource is the same may have different periods.

In this case, CSI having a long period among the plurality of pieces of CSI may be prioritized.

Meanwhile, if the plurality of pieces of CSI in which at least any one of the time resource or the frequency resource has the same has the same period, semi-persistent CSI (SP-CSI) may be prioritized over periodic CSI (P-CSI).

Furthermore, if the plurality of pieces of CSI in which at least any one of the time resource or the frequency resource is the same has a difference between periods within a threshold or preset range, semi-persistent CSI (SP-CSI) may be prioritized over periodic CSI (P-CSI).

In this case, the difference between periods within the threshold or the preset range may mean a period difference having a specific multiple or a period difference of a specific value or less.

Furthermore, the predetermined rule may be transmitted through higher layer signaling.

In this case, the UE performing the method may be implemented to have the following configuration.

The UE may include a radio frequency (RF) module for transmitting and receiving radio signals and a processor functionally connected to the RF module.

In this case, the processor may receive, from a base station, downlink control information (DCI) including a reporting trigger for a plurality of pieces of CSI having the same type.

Furthermore, if a collision occurs between a plurality of pieces of CSI in which at least any one of a time resource or frequency resource is the same, the processor may determine a priority between the plurality of pieces of CSI based on a predetermined rule.

Furthermore, if at least any one of the time resource and frequency resource for reporting between the plurality of pieces of CSI is the same, the processor may report specific CSI determined based on the predetermined rule among the plurality of pieces of CSI.

In this case, the specific CSI may be prioritized CSI determined based on the predetermined rule among the plurality of pieces of CSI.

In this case, the plurality of pieces of CSI may be semi-persistent CSI (SP-CSI) and/or periodic CSI (P-CSI).

Furthermore, the processor may be configured to prioritize CSI having a long period among the plurality of pieces of CSI in which at least any one of the time resource or the frequency resource is the same.

Furthermore, the processor may be configured to prioritize semi-persistent CSI (SP-CSI) over periodic CSI (P-CSI) if the plurality of pieces of CSI in which at least any one of the time resource or the frequency resource is the same has the same period.

Furthermore, if the plurality of pieces of CSI in which the at least any one of the time resource and frequency resource is the same has a period difference within a threshold or a preset range, the processor may be configured to prioritize semi-persistent CSI (SP-CSI) over periodic CSI (P-CSI).

In this case, the period difference within the threshold or the preset range may mean a period difference having a specific multiple or a period difference of a specific value or less.

In addition, in this case, the meaning that at least any one of the time resource and frequency resource is the same may mean a case where a collision has occurred.

FIG. 10 is a flowchart illustrating an example of an operating method of a base station receiving channel state information based on a priority, which is proposed in the present disclosure.

First, the base station transmits, to a UE, downlink control information (DCI) including a reporting trigger for a plurality of pieces of CSI having the same type (S1010).

Next, the base station receives, from the UE, reporting for specific CSI among the plurality of pieces of CSI (S1020).

In this case, the priority may be determined by the aforementioned method.

In this case, the base station performing the method may be implemented to have the following configuration.

The base station may include a radio frequency (RF) module for transmitting and receiving radio signals and a processor functionally connected to the RF module.

In this case, the processor may transmit, to a UE, DCI including a reporting trigger for a plurality of pieces of CSI having the same type.

Furthermore, the processor may receive, from the UE, reporting for specific CSI among the plurality of pieces of CSI.

In this case, the specific CSI may be prioritized CSI determined based on a predetermined rule among the plurality of pieces of CSI.

A case where pieces of CSI having Type 1 and Type 2 collide against each other is described below.

In NR, if Type 2 CSI is reported in a PUCCH, only Part 1 of Part 1 and Part2 configuring the Type 2 CSI is transmitted.

Meanwhile, if Type 2 is reported in a PUSCH, full CSI (i.e., Part 1+Part2 CSI) is reported.

(Proposal 2)

Upon PUCCH-based reporting between pieces of CSI having different types (Type 1 and Type 2), a collision may occur.

In this case, Type 2 CSI has a priority over Type 1 CSI.

As described above, if Type 2 CSI is reported in a long PUCCH, only Part 1 portion (containing CRI/RI/CQI/non-zero power amplitude info.) among all of pieces of CSI is reported.

In such a case, upon PUSCH reporting of Type 2 CSI, effective resource allocation may be used.

Accordingly, Type 2 CSI may be prioritized over Type 1 because the information may be used in a base station operation, such as associated A-CSI triggering.

(Proposal 2-1)

A collision may occur upon PUCCH based reporting between pieces of CSI having different types (Type 1 and Type 2).

In this case, a CSI type having a relatively long period has a priority.

Meanwhile, if Type 1 CSI and Type 2 CSI are configured to have the same period or a period difference of a specific W (W is configurable) multiple or within a specific threshold (X slot or Y ms can be configurable), Type 1 CSI is prioritized over Type 2 CSI.

In addition, Type 1 and Type 2 may be reported with the same period or a specific period difference.

In this case, in the calculation complexity of a UE, Type 2 is much complicated. Accordingly, to report Type 1 may be much efficient from the standpoint of the UE.

(Proposal 2-2)

A collision may occur upon PUCCH-based reporting between pieces of CSI having different types (Type 1 and Type 2).

In this case, a priority rule between CSI Types may be notified through a higher layer (e.g., RRC or MAC CE or DCI).

(Proposal 3)

A collision occurs upon PUCCH based reporting between pieces of CSI having different types (Type 1 and Type 2), but reported PUCCH resources may not overlap.

In this case, whether one of the two pieces of CSI will be dropped or both the pieces of CSI will be transmitted may be determined depending on UE capability.

Meanwhile, if both Type 1 CSI and Type 2 CSI are calculated for CSI reporting at the same timing, the calculation complexity of a UE may be significantly increased.

Accordingly, whether the calculation is possible may be determined depending on the UE capability.

For example, if the number of CSI processes which may be processed by a UE at the same timing is 2, all pieces of CSI having respective types may be calculated and reporting may be performed.

Meanwhile, if the number of CSI processes which may be processed by a UE at the same timing is 1, CSI having a specific type may be dropped depending on the aforementioned priority.

Alternatively, the UE may transmit previous reporting CSI without update with respect to one piece of CSI instead of dropping specific CSI.

In this case, a CSI type whose outdated CSI is transmitted may be determined based on the priority rule, or the UE may be notified the CSI type through a higher layer.

Furthermore, the CSI type may be pre-defined as a specific CSI type (e.g., Type 2 CSI).

(Proposal 4)

SP-CSI and P-CSI may be configured as the same CSI type or different CSI types, and a collision may occur at specific timing and/or in a PUCCH resource level.

In this case, P-CSI reporting may be deactivated.

Furthermore, a base station may configure SP-CSI reporting.

The reason for this is that the base station receives periodic CSI reporting using P-CSI reporting and then performs an operation in a specific environment.

For example, the base station may change an antenna port number/codebook configuration or perform an SU-MIMO operation and may then perform an MU-MIMO operation in a specific environment.

Accordingly, periodic reporting configured in RRC may be meaningless due to such an operation.

Accordingly, in this case, it is preferred to deactivate P-CSI in terms of UE complexity and battery power reduction.

In such a case, particularly, a low-end UE having small process power may be more preferred.

Accordingly, to "ON"/"Off" the proposal previously agreed based on additional capability reporting of the UE may be determine or the proposal may be indicated in the UE through additional higher layer signaling.

General Apparatus to which the Present Disclosure may be Applied

FIG. 11 illustrates a block diagram of a wireless communication apparatus to which methods proposed in the present disclosure may be applied.

Referring to FIG. 11, a wireless communication system includes an eNB 1110 and a plurality of user equipments 1120 disposed within the area of the eNB 1110.

The eNB and the UE may be represented as wireless devices, respectively.

The eNB 1110 includes a processor 1111, a memory 1112 and a radio frequency (RF) module 1113.

The processor 1111 implements the function, process and/or method proposed in FIGS. 1 to 10. The layers of a radio interface protocol may be implemented by the processor. The memory 1112 is connected to the processor, and stores various pieces of information for driving the processor. The RF module 1113 is connected to the processor, and transmits and/or receives a radio signal.

The UE 1120 includes a processor 1121, a memory 1122 and an RF module 1123.

The processor 1121 implements the function, process and/or method proposed in FIGS. 1 to 10. The layers of a radio interface protocol may be implemented by the processor. The memory 1122 is connected to the processor, and stores various pieces of information for driving the processor. The RF module 1123 is connected to the processor, and transmits and/or receives a radio signal.

The memory 1112, 1122 may be positioned inside or outside the processor 1111, 1121 and may be connected to the processor 1111, 1121 by various well-known means.

Furthermore, the eNB 1110 and/or the UE 1120 may have a single antenna or multiple antennas.

FIG. 12 illustrates a block diagram of a communication apparatus according to an embodiment of the present disclosure.

Particularly, FIG. 12 is a diagram illustrating the UE of FIG. 11 more specifically.

Referring to FIG. 12, the UE may include a processor (or digital signal processor (DSP)) 1210, an RF module (or RF unit) 1235, a power management module 1205, an antenna 1240, a battery 1255, a display 1215, a keypad 1220, a memory 1230, a subscriber identification module (SIM) card 1225 (this element is optional), a speaker 1245, and a microphone 1250. Furthermore, the UE may include a single antenna or multiple antennas.

The processor 1210 implements the function, process and/or method proposed in FIGS. 1 to 10. The layers of a radio interface protocol may be implemented by the processor.

The memory 1230 is connected to the processor, and stores information related to the operation of the processor. The memory 1230 may be positioned inside or outside the processor and may be connected to the processor by various well-known means.

A user inputs command information, such as a telephone number, by pressing (or touching) a button of the keypad 1220 or through voice activation using the microphone 1250, for example. The processor receives such command information and performs processing so that a proper function, such as making a phone call to the telephone number, is performed. Operational data may be extracted from the SIM card 1225 or the memory. Furthermore, the processor may display command information or driving information on the display 1215 for user recognition or convenience.

The RF module 1235 is connected to the processor and transmits and/or receives RF signals. The processor delivers command information to the RF module so that the RF module transmits a radio signal that forms voice communication data, for example, in order to initiate communication. The RF module includes a receiver and a transmitter in order to receive and transmit radio signals. The antenna 1240 functions to transmit and receive radio signals. When a radio signal is received, the RF module delivers the radio signal so that it is processed by the processor, and may convert the signal into a baseband. The processed signal may be converted into audible or readable information output through the speaker 1245.

FIG. 13 is a diagram illustrating an example of the RF module of a wireless communication apparatus to which a method proposed in the present disclosure may be applied.

Specifically, FIG. 13 shows an example of an RF module that may be implemented in a frequency division duplex (FDD) system.

First, in a transmission path, the processor described in FIGS. 11 and 12 processes data to be transmitted and provides an analog output signal to a transmitter 1310.

In the transmitter 1310, the analog output signal is filtered by a low pass filter (LPF) 1311 in order to remove images caused by digital-to-analog conversion (ADC). The signal is up-converted from a baseband to an RF by a mixer 1312 and is amplified by a variable gain amplifier (VGA) 1313. The amplified signal is filtered by a filter 1314, additionally amplified by a power amplifier (PA) 1315, routed by a duplexer(s) 1350/antenna switch(es) 1360, and transmitted through an antenna 1370.

Furthermore, in a reception path, the antenna 1370 receives signals from the outside and provides the received signals. The signals are routed by the antenna switch(es) 1360/duplexers 1350 and provided to a receiver 1320.

In the receiver 1320, the received signals are amplified by a low noise amplifier (LNA) 1323, filtered by a band pass filter 1324, and down-converted from the RF to the baseband by a mixer 1325.

The down-converted signal is filtered by a low pass filter (LPF) 1326 and amplified by a VGA 1327, thereby obtaining the analog input signal. The analog input signal is provided to the processor described in FIGS. 11 and 12.

Furthermore, a local oscillator (LO) 1340 generates transmission and reception LO signals and provides them to the mixer 1312 and the mixer 1325, respectively.

Furthermore, a phase locked loop (PLL) 1330 receives control information from the processor in order to generate transmission and reception LO signals in proper frequencies, and provides control signals to the local oscillator 1340.

Furthermore, the circuits shown in FIG. 13 may be arrayed differently from the configuration shown in FIG. 12.

FIG. 14 is a diagram illustrating another example of the RF module of a wireless communication apparatus to which a method proposed in the present disclosure may be applied.

Specifically, FIG. 14 shows an example of an RF module that may be implemented in a time division duplex (TDD) system.

The transmitter 1410 and receiver 1420 of the RF module in the TDD system have the same structure as the transmitter and receiver of the RF module in the FDD system.

Hereinafter, only a different structure between the RF module of the TDD system and the RF module of the FDD system is described. Reference is made to the description of FIG. 13 for the same structure.

A signal amplified by the power amplifier (PA) 1415 of the transmitter is routed through a band select switch 1450, a band pass filter (BPF) 1460 and an antenna switch(es) 1470 and is transmitted through an antenna 1480.

Furthermore, in a reception path, the antenna 1480 receives signals from the outside and provides the received signals. The signals are routed through the antenna switch(es) 1470, the band pass filter 1460 and the band select switch 1450 and are provided to the receiver 1420.

In the embodiments described above, the components and the features of the present disclosure are combined in a predetermined form. Each component or feature should be considered as an option unless otherwise expressly stated. Each component or feature may be implemented not to be associated with other components or features. Furthermore, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of an implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of an implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means. It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

INDUSTRIAL APPLICABILITY

The method of reporting channel state information based on a priority in a wireless communication system according to the present disclosure has been illustrated as being applied to a 3GPP LTE/LTE-A system and a 5G system (new RAT system), but may be applied to various other wireless communication systems in addition to the above systems.

The invention claimed is:

1. A method of reporting channel state information (CSI) based on a priority in a wireless communication system, the method performed by a terminal comprising:

receiving, from a base station, downlink control information (DCI) including a reporting trigger for some of a plurality of pieces of CSI using periodic reporting, wherein the some of the plurality of pieces of CSI is semi-persistent CSI (SP-CSI) and remaining of the plurality of pieces of CSI other than the some of the plurality of pieces of CSI is periodic-CSI (P-CSI); and reporting specific CSI determined based on a predetermined rule among the plurality of pieces of CSI when at least any one of time resources and frequency resources for reporting between the plurality of pieces of CSI is identical, wherein the specific CSI is CSI prioritized based on the predetermined rule among the plurality of pieces of CSI, and wherein the predetermined rule includes prioritizing the SP-CSI over the P-CSI when the plurality of pieces of CSI for which at least any one of the time resource or the frequency resource is identical and has a period difference within a threshold or preset range.

2. The method of claim 1, wherein the predetermined rule further includes prioritizing CSI having a long period among the plurality of pieces of CSI for which at least any one of the time resource or the frequency resource is identical.

3. The method of claim 1, wherein the predetermined rule further includes prioritizing CSI having a long period among the plurality of pieces of CSI for which at least any one of the time resource or the frequency resource is identical.

4. The method of claim 1, wherein the predetermined rule is transmitted through higher layer signaling.

5. A terminal performing a method of reporting channel state information (CSI) based on a priority in a wireless communication system, the terminal comprising:

a transmitter;

a receiver; and a processor functionally connected to the transmitter and the receiver, wherein the processor is configured to:

control the receiver to receive, from a base station, downlink control information (DCI) including a reporting trigger for some of a plurality of pieces of CSI using periodic reporting, wherein the some of the plurality of pieces of CSI is semi-persistent CSI (SP-CSI) and remaining of the plurality of pieces of CSI other than the some of the plurality of pieces of CSI is periodic-CSI (P-CSI); and control the transmitter to report specific CSI determined based on a predetermined rule among the plurality of pieces of CSI when at least any one of time resources and frequency resources for reporting between the plurality of pieces of CSI is identical, wherein the specific CSI is CSI prioritized based on the predetermined rule among the plurality of pieces of CSI, and wherein the predetermined rule includes prioritizing the SP-CSI over the P-CSI when the plurality of pieces of CSI for which at least any one of the time resource or the frequency resource is identical and has a period difference within a threshold or preset range.

6. The terminal of claim 5, wherein the predetermined rule further includes prioritizing CSI having a long period among the plurality of pieces of CSI for which at least any one of the time resource or the frequency resource is identical.

7. The terminal of claim 5, wherein the predetermined rule further includes prioritizing CSI having a long period among the plurality of pieces of CSI for which at least any one of the time resource or the frequency resource is identical.

8. The terminal of claim 5, wherein the predetermined rule is transmitted through higher layer signaling.

9. A method of reporting channel state information (CSI) based on a priority in a wireless communication system, the method performed by a base station comprising:

transmitting, to a terminal, downlink control information (DCI) including a reporting trigger for some of a plurality of pieces of CSI using periodic reporting, wherein the some of the plurality of pieces of CSI is semi-persistent CSI (SP-CSI) and remaining of the plurality of pieces of CSI other than the some of the plurality of pieces of CSI is periodic-CSI (P-CSI); and receiving, from the terminal, reporting for specific CSI among the plurality of pieces of CSI, wherein the specific CSI is CSI prioritized based on the predetermined rule among the plurality of pieces of CSI, and wherein the predetermined rule includes prioritizing the SP-CSI over the P-CSI when the plurality of pieces of CSI for which at least any one of the time resource or the frequency resource is identical and has a period difference within a threshold or preset range.

* * * * *